Aug. 15, 1961   M. M. MUNK   2,995,939
MERCURY GYROSCOPE
Filed March 23, 1953   2 Sheets-Sheet 1
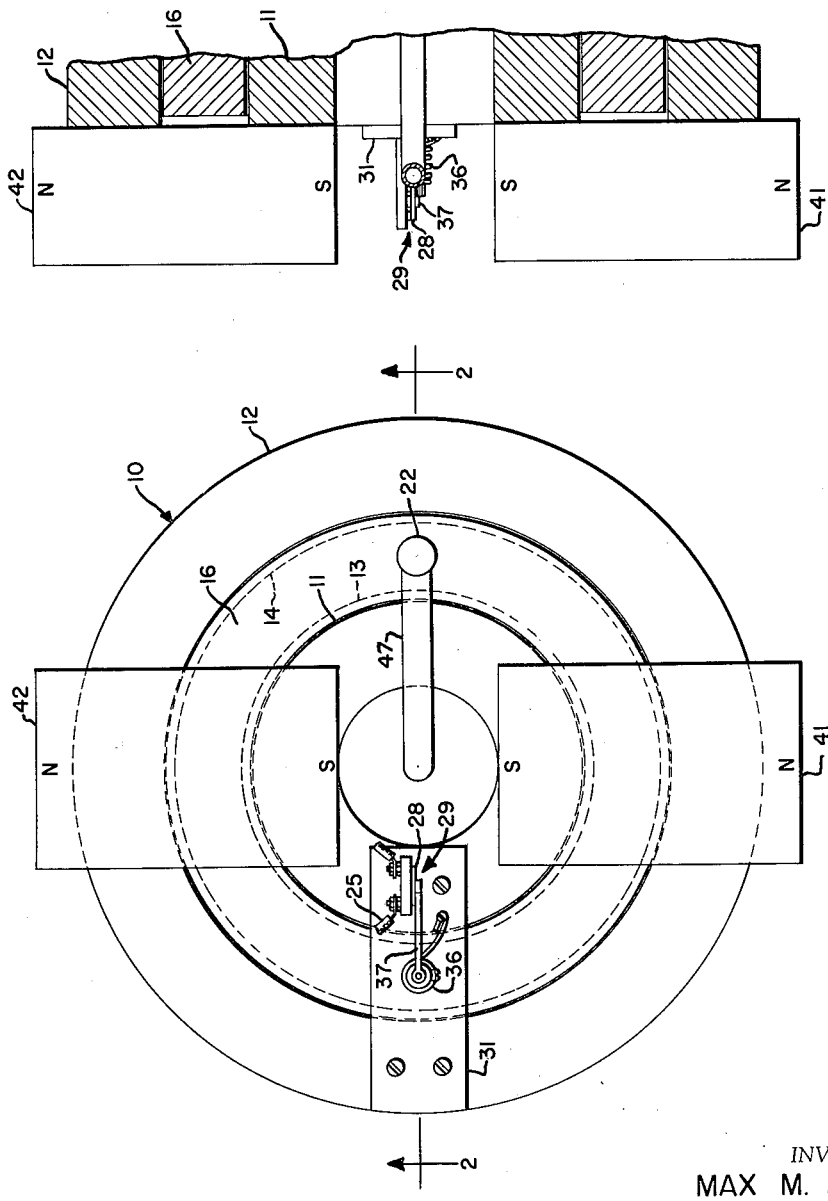
INVENTOR
MAX M. MUNK
BY
ATTORNEYS

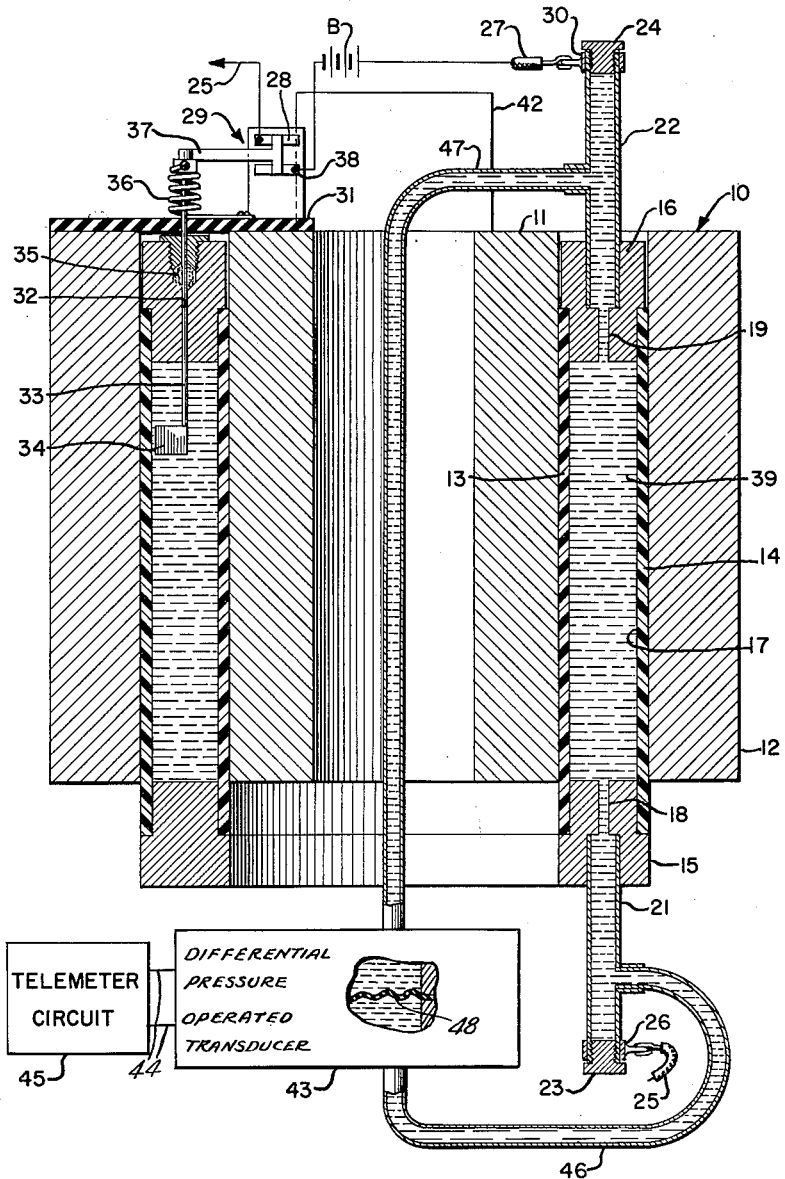

United States Patent Office 2,995,939
Patented Aug. 15, 1961

2,995,939
MERCURY GYROSCOPE
Max M. Munk, Hyattsville, Md., assignor to the United States of America as represented by the Secretary of the Navy
Filed Mar. 23, 1953, Ser. No. 344,252
5 Claims. (Cl. 74—5.7)
(Granted under Title 35, U.S. Code (1952), sec. 266)

The invention described herein may be manufactured and used by or for the Government of the United States of America for governmental purposes without the payment of any royalties thereon or therefor.

The present invention relates to gyroscopes and, more particularly, to gyroscopes employing an electro-conducting fluid such, for example, as mercury, as a rotor element for measuring angular velocity for a moving body when the body rotates about an axis inclined to the axis of rotation of the fluid.

In aerial navigation and during test firings of missiles, it is necessary to observe the angular velocity or components of the angular velocity of the moving body. It is well known to employ precision gyroscopes of the mechanical type for such purpose, the gyroscopes so employed, however, being bulky, costly and delicate, and thus not wholly suited for use where great reliability and economy are required, as for example, in gun propelled missiles.

The present invention provides an annulus of mercury as the rotating member, the mercury being caused to rotate electro-dynamically in the manner of a unipolar motor between a pair of annular members of magnetic material by causing a current to pass through the mercury perpendicular to the desired direction of motion thereof, the mercury being insulated from the annular members. Switching apparatus is provided for opening the mercury energizing circuit when rotation of the mercury reaches a high predetermined speed and for closing the circuit when the rotation of the mercury falls below a lower predetermined speed.

Apparatus is also provided for measuring variations in pressure of the rotating mercury when turns are made by the moving body, thus indicating the angular velocity during such maneuvers, as well as indicating that a turn is being made.

An object of the present invention is to provide a new and improved gyroscope having a liquid rotor for indicating the angular velocity of a moving body during deviations from a straight course.

Another object is to provide a new and improved fluid gyroscope wherein the rotative speed of the fluid is maintained within predetermined limits.

Still another object is to provide a new and improved mercury gyroscope wherein the mercury is caused to rotate by electro-dynamic force in the manner of a unipolar motor.

Other objects and many of the attendant advantages of this invention will be readily appreciated as the same becomes better understood by reference to the following detailed description when considered in connection with the accompanying drawings wherein:

FIG. 1 is an end elevation of the device of the present invention;

FIG. 2 is a sectional view taken along the line 2—2 of FIG. 1; and

FIG. 3 is a sectional view showing the permanent magnets and the mounting thereof with respect to the magnetic annular members.

Referring more particularly to the drawings wherein like numerals indicate like parts throughout the several views, 10 indicates generally the device of the present invention and comprises inner and outer annular or ring members of magnetic material 11 and 12, respectively. Mounted in close adjacency to the outer wall of member 11 is a thin shell of insulating material 13, while mounted in close adjacency to the inner wall of member 12 is a second thin shell of insulating material 14. Sealing rings 15 and 16 of non-magnetic material such, for example, as a suitable plastic are employed to close the ends of a chamber 17 formed by shells 13 and 14.

Sealing rings 15 and 16 are provided with bores 18 and 19 respectively, communicating with chamber 17. Bore 18 has a tube 21 extending outwardly therefrom, while bore 19 has a tube 22 extending therefrom. Sealing plugs 23 and 24 are respectively mounted in the outer ends of tubes 21 and 22.

An electrical conductor 25 is connected at 26 to tube 21, while electrical conductor 27 is connected at 30 to tube 22. Conductor 27 is connected to a source of electric power such as a battery B or other convenient source. Conductor 25 leads to contact 28 of a switch indicated generally at 29. Switch 29 is mounted on insulator block 31 which, in turn, is secured on rings 11 and 12 in alignment with a bore 32 in sealing ring 16. A shaft 33 having a flag or vane 34 on the inner end thereof extends through bore 32. Bore 32 is provided with a packing gland or other sealing device 35. Shaft 33 is spring biased at 36 to provide a predetermined resistance to turning thereof for a purpose to be hereinafter more fully described. An arm 37 is fixedly mounted on the outer end of shaft 33 and is adapted to normally bridge the gap between contact 28 and a contact 38 connected to the aforementioned source of power B.

A pair of permanent bar magnets 41 and 42 are mounted across ring members 11 and 12 at diametrically opposite points. As clearly shown in FIGS. 1 and 3 the magnets 41 and 42 have their north poles engaging ring member 12, while the south poles thereof engage ring member 11 thus setting up a radial magnetic field across the gap defined by the chamber 17.

Chamber 17 is filled with an electrically conducting fluid such as mercury 39. Let it be assumed that switch 29 is closed. An electric current will then flow through the mercury 39 from tube 21 to tube 22 parallel to axis of chamber 17. By the combination of the said magnetic field and electric current the mercury is rotated in the manner of a unipolar motor in chamber 17 around the axis of ring members 11 and 12. It must also be understood that the mercury may be rotated by an axial magnetic field and a radial current.

Switch 29 is employed as a control device for maintaining the rotative speed of the mercury 39 substantially constant. As the mercury reaches a predetermined speed of rotation, pressure against vane 34 overcomes the spring 36 causing shaft 32 to rotate arm 57 in a direction away from contacts 28 and 38 thus opening the circuit supplying current to rotate the mercury 39 and causing the rotation of the mercury to retard. When the mercury has reached a predetermined lower speed of rotation, pressure on vane 34 is relieved sufficiently for spring 36 to move arm 37 into engaging position with respect to contacts 28 and 38 thus energizing the mercury driving circuit.

The mercury gyroscope 10 is intended to be mounted in a missile. The axis of rotation of 10 may either be in any direction relative to the intended direction of travel of the missile, but it is preferred to mount it either parallel or also at right angles to said direction of motion. The gyroscope having its axis at right angles to the intended direction of motion will indicate the rate of spin, if any, of the missile about its intended direction of motion. The gyroscope having its axis parallel to the intended direction of travel will constitute a turn indication, and will indicate the rate of turn.

In order to measure such angular velocity, a conduit 46 is connected to tube 21 while conduit 47 is connected to tube 22. Conduit 46 leads to one side of a differential pressure operated transducer 43, while conduit 47 leads to the other side thereof. The transducer 43 is of any well known variety wherein pressures developed in conduits 46 and 47 oppose each other against opposite sides of a diaphragm 48 or other such device thus to move a variable capacitor, resistor or other current varying means in accordance with differences of pressure in either of the conduits with respect to the other of the conduits.

Conductors 44 lead from the current varying means of transducer 43 to a telemetering circuit 45 which may be of the type which transmits to a remote receiver (not shown) signals indicative of such current variations and thus to indicate the variations in pressure at the remote receiver.

Let it be assumed that mercury 39 is rotating at a predetermined high speed and the device 10 is fixed in a moving body with the axis of rotation of the mercury at right angles to the direction of travel of the body which body, for example, may be a vehicle, aircraft, missile, torpedo or ordnance device, either spinning or non-spinning. The rotating mercury acts in the manner of the rotor of a mechanical gyroscope and tends to maintain a fixed position in chamber 17. When the body turns to the right or to the left, the mercury resists such turning and increases the pressure on the right or the left side of the chamber against sealing rings 15 or 16 thus increasing pressure in one or the other side of transducer 43 through conduits 46 or 47, as the case may be, the pressure increase being accompanied by a corresponding decrease in pressure in the other side of the transducer 43. When the device is fixed to the body with the axis thereof vertical and transverse to the direction of travel of the body and the body pitches as a vessel during such travel, a pressure differential on opposite sides of the transducer 43 is developed which is correlative with the angular velocity of such pitching action. Thus the diaphragm or other pressure sensitive device is moved in accordance with the change in pressures and moving in accordance therewith a current varying medium controlling the electrical output through conductors 44.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A gyroscope for indicating the angular velocity and components thereof of a moving body comprising, in combination, an annular container fixedly secured to said body, said container comprising a pair of coaxially-aligned radially-spaced hollow cylindrical members of electrical insulating material, a pair of non-magnetic annular members respectively sealing the ends of said container, each of said annular members having a tube receiving orifice communicating with the interior of said container, a pair of tubes set in said orifices, a differential pressure operated transducer having a diaphragm, means connected to one of said tubes for establishing communication between said one of said tubes and one side of said diaphragm, means connected to the other one of said tubes for establishing communication between said other one of said tubes and the other side of said diaphragm, a quantity of mercury filling said chamber and extending through said tubes and said communicating means into said differential pressure operated transducer, means including a pair of annular coaxially aligned radially spaced pole pieces of mutually opposed magnetic polarity, said container being mounted in the spacing between said pair of pole pieces whereby a magnetic field passes radially through said mercury, means for passing an electrical current through said mercury substantially at right angles to the path of said magnetic field thereby to rotate said mercury, and means controlled by the rotation of said mercury for deenergizing said current means when the mercury reaches a predetermined high speed of rotation and re-energizing the current means when the mercury reaches a predetermined low speed of rotation.

2. A gyroscope for indicating the angular velocity and components thereof of a moving body comprising in combination, a hollow annular container fixedly mounted in said body, a quantity of electro-conducting fluid in said container, means mounted adjacent said container for causing a permanent magnetic field to pass radially through said fluid, means for causing an electrical current to pass unidirectionally through said fluid at right angles to said magnetic field thereby to cause the fluid to rotate, means including a movable vane disposed within said fluid and responsive to the speed of rotation thereof for regulating said current to maintain the rotative speed of said fluid at a predetermined rate of rotation, and differential pressure means connected to said container for measuring variations in differential pressure at the end portions of said container when said body executes a rotation about an axis not parallel to the axis of rotation of the fluid.

3. Apparatus for causing an annulus of electro-conducting fluid to rotate around the axis thereof comprising, in combination, a hollow annular housing having a quantity of electro-conducting fluid disposed therein, means for passing a permanent magnetic field radially through said fluid, a source of electrical current, means for passing an electrical current from said source unidirectionally through said fluid at a right angle to said magnetic field thereby to cause the fluid to rotate within said housing, a spring biased vane disposed within said fluid and movable from an initial position to a moved position when the rate of rotation of the fluid increases to a predetermined value, and a normally closed switch connected to said source and movable to open position by said vane as the vane moves into said moved position thereby to interrupt said current.

4. Apparatus for causing an annulus of electro-conducting fluid to rotate around the axis thereof comprising, in combination, a hollow annular housing for said fluid having a quantity of electro-conducting fluid therein, permanent magnet means for radially passing a magnetic field radially through said fluid, means for passing an electrical current unidirectionally through said fluid at a right angle to said magnetic field to cause rotation of the fluid, a movable spring biased vane disposed within said fluid and movable from an initial position to a moved position when the speed of the fluid reaches a predetermined value, and means controlled by said vane for periodically interrupting said current to control the rotative speed of said fluid.

5. Apparatus according to claim 4 including a transducer, a pair of ducts interconnecting the transducer with the fluid at opposite ends of said housing respectively whereby the transducer is responsive to a pressure differential applied to said ducts and the position of the housing is changed, and a telemeter circuit connected to said transducer for operation thereby selectively in accordance with the differential pressure applied to the transducer.

References Cited in the file of this patent

UNITED STATES PATENTS

| 1,102,653 | Goddard | July 7, 1914 |
| 1,298,664 | Chubb | Apr. 1, 1919 |
| 1,841,606 | Kollsman | Jan. 19, 1932 |
| 2,652,778 | Crever | Sept. 22, 1953 |
| 2,949,784 | Maeder | Aug. 23, 1960 |

FOREIGN PATENTS

| 1,185,380 | France | Feb. 16, 1959 |

OTHER REFERENCES

General Electric Review, vol. 55, No. 3, pp. 24, 25, May 1952, 310/11.